US008732344B2

(12) United States Patent
Miyazawa

(10) Patent No.: US 8,732,344 B2
(45) Date of Patent: *May 20, 2014

(54) MANAGEMENT DEVICE, MEDIUM FOR THE SAME, AND MANAGEMENT SYSTEM

(75) Inventor: Masafumi Miyazawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,207

(22) Filed: Sep. 14, 2012

(65) Prior Publication Data

US 2013/0007309 A1 Jan. 3, 2013

(30) Foreign Application Priority Data

Mar. 30, 2006 (JP) ................................ 2006-095014

(51) Int. Cl.
*G06F 3/00* (2006.01)

(52) U.S. Cl.
USPC .................... 710/8; 710/15; 710/72; 710/105

(58) Field of Classification Search
None
See application file for complete search history.

(56) References Cited

U.S. PATENT DOCUMENTS

| 5,900,017 | A | * | 5/1999 | Genduso et al. | 711/146 |
| 5,933,582 | A | | 8/1999 | Yamada | |
| 6,871,296 | B2 | * | 3/2005 | Kashyap | 714/13 |
| 6,993,026 | B1 | * | 1/2006 | Baum et al. | 370/392 |
| 7,058,705 | B1 | | 6/2006 | Fukasawa et al. | |
| 7,254,629 | B1 | | 8/2007 | Funahashi | |
| 7,254,694 | B2 | * | 8/2007 | Clark et al. | 712/28 |
| 7,269,698 | B2 | * | 9/2007 | Hum et al. | 711/148 |
| 7,313,612 | B1 | | 12/2007 | Kakimoto | |
| 7,395,374 | B2 | * | 7/2008 | Tierney et al. | 711/141 |
| 7,434,008 | B2 | * | 10/2008 | Shaw | 711/146 |

(Continued)

FOREIGN PATENT DOCUMENTS

| JP | HEI 10-161907 | 6/1998 |
| JP | 2000-112802 | 4/2000 |

(Continued)

OTHER PUBLICATIONS

Dong-Hoon Lee; Sung-Gi Min; "Network Scanning on Multi Function Device"; Advances in Multimedia, 2009. MMEDIA '09. First International Conference on Digital Object Identifier: 10.1109/MMEDIA.2009.28; Publication Year: 2009 , pp. 116-120.

(Continued)

*Primary Examiner* — Cheng-Yuan Tseng
(74) *Attorney, Agent, or Firm* — Scully, Scott, Murphy & Presser PC

(57) ABSTRACT

A management device configured to communicate with at least one second management device and at least one terminal device via a network includes an acquiring system configured to acquire first management information managed by the management device, a receiving system configured to receive second management information managed by each of the at least one second management device from each of the at least one second management device, a management information request receiving system configured to receive a management information request for the first management information and the second management information from the at least one terminal device, and a sending system configured to send, to the at least one terminal device, the first management information acquired by the acquiring system and the second management information received by the receiving system in response to the management information request being received by the management information request receiving system.

12 Claims, 9 Drawing Sheets

(56) References Cited

U.S. PATENT DOCUMENTS

| | | | |
|---|---|---|---|
| 7,512,741 B1* | 3/2009 | Batson et al. | 711/141 |
| 7,543,115 B1* | 6/2009 | Batson et al. | 711/141 |
| 7,583,669 B2* | 9/2009 | Yoo et al. | 370/390 |
| 7,609,663 B2* | 10/2009 | Neuhaus et al. | 370/312 |
| 7,636,338 B1* | 12/2009 | Vu et al. | 370/338 |
| 7,640,314 B2* | 12/2009 | Kojima | 709/208 |
| 7,653,810 B2 | 1/2010 | Thornton et al. | |
| 7,673,008 B2* | 3/2010 | Kojima | 709/208 |
| 7,673,104 B2* | 3/2010 | Sugizaki | 711/146 |
| 7,822,929 B2* | 10/2010 | Cen | 711/141 |
| 8,291,217 B2* | 10/2012 | Miyazawa | 713/158 |
| 2004/0049578 A1 | 3/2004 | Ohara | |
| 2004/0083240 A1 | 4/2004 | Sekine | |
| 2004/0103161 A1 | 5/2004 | Matsumoto | |
| 2004/0172469 A1 | 9/2004 | Takahashi et al. | |
| 2005/0018242 A1 | 1/2005 | Azami | |
| 2005/0163514 A1 | 7/2005 | Hwang | |
| 2005/0177625 A1* | 8/2005 | Paek et al. | 709/219 |
| 2006/0075221 A1 | 4/2006 | Moore et al. | |
| 2006/0080319 A1* | 4/2006 | Hickman et al. | 707/10 |
| 2006/0126118 A1 | 6/2006 | Nagata | |
| 2006/0155855 A1 | 7/2006 | Hamai | |
| 2006/0212602 A1 | 9/2006 | Fukasawa et al. | |

FOREIGN PATENT DOCUMENTS

| | | |
|---|---|---|
| JP | 2001-43160 | 2/2001 |
| JP | 2001-175576 | 6/2001 |
| JP | 2003-273855 | 9/2003 |
| JP | 2004-29936 | 1/2004 |
| JP | 2004-46302 | 2/2004 |
| JP | 2004-220562 A | 8/2004 |
| JP | 2004-364179 | 12/2004 |
| JP | 2005-1128 | 1/2005 |
| JP | 2005-122379 | 5/2005 |
| JP | 2005-269558 | 9/2005 |
| JP | 2005-352940 | 12/2005 |
| JP | 2008-182551 | 8/2008 |
| WO | WO 2005/017738 | 2/2005 |

OTHER PUBLICATIONS

Japanese Official Action dated Nov. 5, 2009 with English translation.
United States Official Action dated Apr. 28, 2010 from related U.S. Appl. No. 11/727,958.
United States Official Action dated Oct. 14, 2012 from related U.S. Appl. No. 11/727,958.
United States Official Action dated Jul. 29, 2011 from related U.S. Appl. No. 11/727,958.
United States Official Action dated Dec. 7, 2011 from related U.S. Appl. No. 11/727,958.
United States Official Action dated Apr. 21, 2011 from related U.S. Appl. No. 11/727,958.
Notice of Allowance dated Jun. 13, 2012 from related U.S. Appl. No. 11/727,958.
United States Official Action dated Oct. 14, 2010 from related U.S. Appl. No. 11/727,958.

* cited by examiner

DEVICE MANAGEMENT INFORMATION(BROADCAST)

| EXPIRATION DATE OF CERTIFICATE | IP | COMMON NAME OF CERTIFICATE | TIME STAMP | REMAINING TONER AMOUNT | NUMBER OF REMAINING PAPERS |
|---|---|---|---|---|---|
| Jan 15 04:30:04 2011 GMT | 192.168.0.100 | printer01.aaa.com | 2006/1/1 10:30:22 | 50% | 40% |

FIG.9A

DEVICE MANAGEMENT INFORMATION STORED IN DEVICE MANAGEMENT INFORMATION STORING AREA

| EXPIRATION DATE OF CERTIFICATE | IP | COMMON NAME OF CERTIFICATE | TIME STAMP | REMAINING TONER AMOUNT | NUMBER OF REMAINING PAPERS |
|---|---|---|---|---|---|
| Jan 15 04:30:04 2011 GMT | 192.168.0.100 | printer01.aaa.com | 2006/1/1 10:30:22 | 50% | 40% |

FIG.9B

DEVICE MANAGEMENT INFORMATION

| EXPIRATION DATE OF CERTIFICATE | IP | COMMON NAME OF CERTIFICATE | TIME STAMP | REMAINING TONER AMOUNT | NUMBER OF REMAINING PAPERS |
|---|---|---|---|---|---|
| Jan 15 04:30:04 2011 GMT | 192.168.0.100 | printer01.aaa.com | 2006/1/1 10:30:22 | 50% | 40% |
| Jan 15 04:30:04 2015 GMT | 192.168.0.101 | printer02.aaa.com | 2006/1/3 10:30:00 | 55% | 42% |

FIG.9C

MANAGEMENT DEVICE, MEDIUM FOR THE SAME, AND MANAGEMENT SYSTEM

CROSS-REFERENCE TO RELATED APPLICATION

This application is a continuation of U.S. Ser. No. 11/727,958, filed Mar. 29, 2007, which claims priority under 35 U.S.C. sctn.119 from Japanese Patent Application No. 2006-095014, filed on Mar. 30, 2006. The entire subject matter of the application is incorporated herein by reference.

BACKGROUND

1. Technical Field

The following description relates to one or more techniques for managing management information.

2. Related Art

Conventionally, there is known as a communication technology employed for communication between a plurality of devices via a network an SSL (Secure Socket Layer) in which the communication is switched to encrypted communication by informing of a public key using an electronic certificate. In the communication technology, to attain high-security communication, an expiration date is generally set for the electronic certificate. The reason why an expiration date is thus set for the electronic certificate is that even though it is currently impossible to decrypt the encryption in the encrypted communication technology (or it takes long time to decrypt the encryption), there is a risk that the encryption is more likely to be decrypted as a same key (a secret key in the public key encryption) is used for a longer time. Hence, a date until which the encryption is presumed not to be easily decrypted is set as the expiration date.

Accordingly, security is not assured in communication using an expired electronic certificate. Therefore, in order to prevent the electronic certificate from being expired, there is proposed a technique in which a management device that manages the expiration date of the electronic certificate sends a warning mail for warning that the electronic certificate will expire soon to a destination that has previously been set a predetermined time period before the expiration date of the electronic certificate (for example, Japanese Patent Provisional Publication No. 2005-269558).

However, according to a technique described in Japanese Patent Provisional Publication No. 2005-269558, the management device is required to be always powered ON. Namely, when the management device is powered OFF, the management device cannot send the warning mail even at a moment when the warning mail is to be sent. For this reason, the conventional management device cannot adequately manage the expiration date of the electronic certificate.

Therefore, there is caused a problem that the communication security is not assured when a user performs the communication using the electronic certificate without knowing the electronic certificate has been expired.

Such a problem that the warning mail cannot be sent at a moment when the warning mail is to be sent as the management device is powered OFF does not apply only to the management of the expiration date of the electronic certificate but also to management of device information (for instance, information on toner empty in a printing device).

SUMMARY

Aspects of the present invention are advantageous in that there can be provided one or more improved techniques that make it possible to certainly manage management information.

BRIEF DESCRIPTION OF THE ACCOMPANYING DRAWINGS

FIG. 1 schematically shows a configuration of a communication system in accordance with one or more aspects of the present invention.

Figure 1:
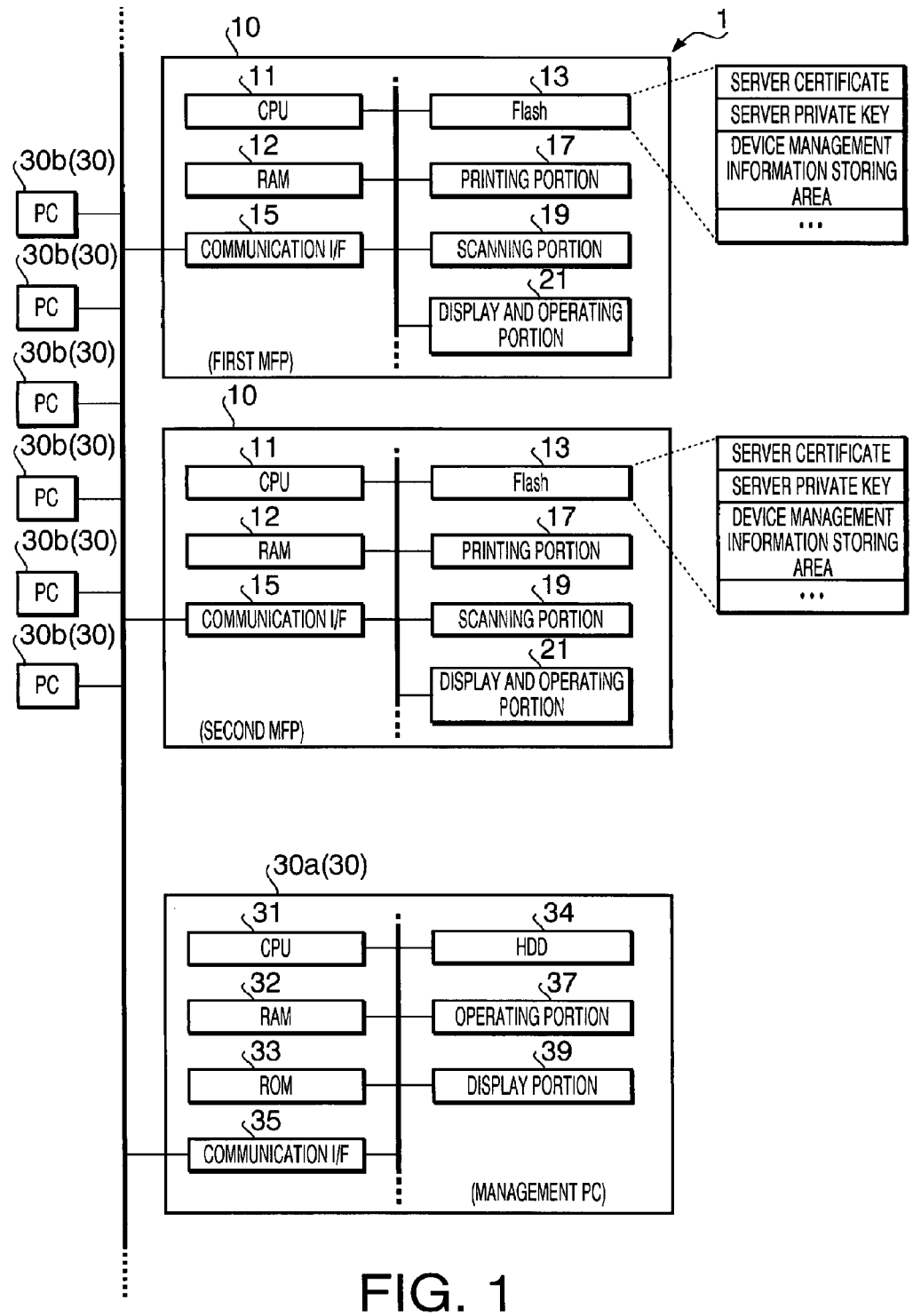

FIGS. 9A, 9B, and 9C are specific examples of the device management information in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a management device configured to communicate with at least one second management device and at least one terminal device via a network, which includes an acquiring system configured to acquire first management information managed by the management device, a receiving system configured to receive second management information managed by each of the at least one second management device from each of the at least one second management device, a management information request receiving system configured to receive a management information request for the first management information and the second management information from the at least one terminal device, and a sending system configured to send, to the at least one terminal device, the first management information acquired by the acquiring system and the second management information received by the receiving system in response to the management information request being received by the management information request receiving system.

According to some aspects, even though the at least one second management device that manages the second management information is powered OFF, the second management information can be transmitted to the at least one terminal device. Therefore, the second management information can certainly be managed by the at least one terminal device.

Optionally, the management device may further include a storage configured to store the second management information received by the receiving system. In this case, the sending system may be configured to send, to the at least one terminal device, the second management information stored in the storage along with the first management information in response to the management information request being received by the management information request receiving system.

Optionally, the management device may further include a broadcasting system configured to send the first management information acquired by the acquiring system to each of the at least one second management device and the at least one terminal device.

According to some aspects, in the case where the at least one second management device is configured as above, as long as at least one of the management devices works, the at least one terminal device can manage the management information managed by all of the management devices.

Optionally, the management device may further include a storing system configured to store a first electronic certificate required for encrypted communication performed by the management device, the first electronic certificate including information on an expiration date thereof until which the first electronic certificate is valid. In this case, the acquiring system may be configured to extract the expiration date of the first electronic certificate from the first electronic certificate stored in the storing system and to incorporate the extracted expiration date into the first management information in response to the management information request being received by the management information request receiving system.

The management information may include device information (for example, which includes information on a remaining toner amount and/or the number of remaining printing papers when the management device is a printing device).

Furthermore, the first management information may include information on an expiration date of a first electronic certificate managed by the management device, which is a certificate required for encrypted communication performed by the management device and valid until the expiration date thereof.

Yet optionally, the second management information may include information on an expiration date of a second electronic certificate managed by the at least one second management device, which is a certificate different from the first electronic certificate and valid until the expiration date thereof.

According to some aspects, even though the at least one second management device that manages the second electronic certificate is powered OFF, the information on the expiration date of the second electronic certificate can be transmitted to the at least one terminal device. Thereby, the at least one terminal device can certainly check whether the electronic certificate required for the encrypted communication is expired. Hence, the management device configured as above makes it possible to assure security of the communication.

Further optionally, the management device may further include an encrypted communication request receiving system configured to receive a request for encrypted communication using the first electronic certificate, an expiration date judging system configured to judge whether the first electronic certificate is expired based on the information on the expiration date of the first electronic certificate that is included in the first management information, in response to the request for the encrypted communication being received by the encrypted communication request receiving system, an encrypted communication performing system configured to perform the encrypted communication with a requesting source that has issued the request for the encrypted communication received by the encrypted communication request receiving system when the expiration date judging system does not judge that the first electronic certificate is expired, and a communication forbidding system configured to forbid the encrypted communication with the requesting source that has issued the request for the encrypted communication when the expiration date judging system judges that the first electronic certificate is expired.

According to some aspects, when the electronic certificate is expired, the encrypted communication using the electronic certificate is forbidden. Thereby, it is possible to prevent low-security communication.

According to another aspect of the present invention, there is provided a management system, which includes a plurality of management devices, and at least one terminal device configured to communicate with the plurality of management devices via a network. Each of the plurality of management devices includes an acquiring system configured to acquire first management information managed by the management device, a receiving system configured to receive second management information managed by each of the other management devices from each of the other management devices, a management information request receiving system configured to receive a management information request for the first management information and the second management information from the at least one terminal device, and a sending system configured to send, to the at least one terminal device, the first management information acquired by the acquiring system and the second management information received by the receiving system in response to the management information request being received by the management information request receiving system. The at least one terminal device includes a requesting system configured to issue the management information request to each of the plurality of management devices, and a management information receiving system configured to receive management information including the first management information and the second management information from the sending system.

According to the management system configured as above, the same effects as those brought by the aforementioned management device can be expected. Specifically, as long as at least one of the management devices works on the network, the second management information can be transmitted to the at least one terminal device. Therefore, the second management information can certainly be managed by the at least one terminal device.

Optionally, each of the plurality of management devices may be configured to incorporate, into the first management information managed thereby, time information on a time when the sending system thereof sends the first management information managed thereby.

Further optionally, the at least one terminal device may further include a deleting system, when the management information receiving system has received a plurality of management information managed by a same management device, the deleting system being configured to delete all of the plurality of management information other than management information including the latest one among the time information included in the plurality of management information.

According to some aspects, even though the terminal device receives a plurality of management information managed by the same management device, the terminal device can delete all of the plurality of management information other than management information including the latest one among the time information included in the plurality of management information. Hence, the terminal device can easily manage a plurality of management information collected thereby. In the management system, the management information may include device information (for example, which includes information on a remaining toner amount and/or the number of remaining printing papers when the management device is a printing device).

Furthermore, the first management information acquired by the acquiring system may include information on an expiration date of a first electronic certificate managed by the management device, which is valid until the expiration date thereof. Still optionally, the second management information received by the receiving system may include information on an expiration date of a second electronic certificate managed by each of the other management devices, which is valid until the expiration date thereof.

According to some aspects, as long as at least one of the management devices works, the information on the expiration date of the second electronic certificate can be transmitted to the one terminal device. Thereby, the terminal device can certainly check whether the electronic certificate required for the encrypted communication is expired. Accordingly, the management system configured as above makes it possible to assure the communication security.

Still optionally, the sending system of the management device may be configured to send the management information with sending source information attached to each of the management information, the sending source information specifying a sending source device of the management information. In this case, the management information receiving system of the at least one terminal device may be configured to receive the management information with the sending source information attached to each of the management information.

Optionally, the at least one terminal device may further include a management device judging system configured to judge whether a management device specified by the sending source information attached to the management information received by the management information receiving system is a management device that manages the management information as received, an expiration judging system configured to judge whether an electronic certificate, of which the information on the expiration date is included in the received management information, will expire within a predetermined period that depends on the judgment by the management device judging system, based on the expiration date of the electronic certificate that is included in the management information, and a certificate update control system configured to perform a process for updating the electronic certificate when it is judged that the electronic certificate will expire within the predetermined period.

Further optionally, when the management device judging system judges that the management device specified by the sending source information attached to the management information received by the management information receiving system is the management device that manages the management information as received, a first period may be employed as the predetermined period. Meanwhile, when the management device judging system does not judge that the management device specified by the sending source information is a management device other than the management device that manages the management information as received, a second period longer than the first period may be employed as the predetermined period.

According to some aspects, it can certainly be prevented that a user forgets to update the electronic certificate that will soon expire. It is noted that the second period is desired to be set longer than the first period. This is because it is necessary to induce the user to early bring the management device other than the management device that manages the management information as received, which might be in an incommunicable state since the expiration date of the electronic certificate managed thereby has not been transmitted directly therefrom, out of the incommunicable state and update the electronic certificate.

According to a further aspect of the present invention, there is provided a computer usable medium having computer readable instructions stored thereon, when executed by a computer configured to communicate with at least one second computer and at least one terminal device via a network, the instructions causing the computer to perform steps of acquiring first management information managed by the computer, receiving second management information managed by each of the at least one second computer from each of the at least one second computer, receiving a management information request for the first management information and the second management information from the at least one terminal device, and sending, to the at least one terminal device, the first management information as acquired and the second management information as received in response to the management information request being received.

According to the computer usable medium configured as above, the same effects as those brought by the aforementioned management device or the management system can be expected. Specifically, even though the at least one second computer that manages the second management information is powered OFF, the second management information can be transmitted to the at least one terminal device. Therefore, the second management information can certainly be managed by the at least one terminal device.

Illustrative Aspects

Hereinafter, an embodiment according to aspects of the present invention will be described with reference to the accompanying drawings. FIG. 1 schematically shows a configuration of a communication system 1 in the embodiment. As shown in FIG. 1, the communication system 1 is configured with digital MFPs (Multi Function Peripherals) (hereinafter, simply referred to as "MFPs") 10 and personal computers (hereinafter, simply referred to as "PCs") 30 being connected with a TCP/IP network. In particular, in the embodiment, a plurality of MFPs 10 (a first MFP and a second MFP) having the same configuration and a plurality of PCs 30 (PCs 30*b* and a management PC 30*a*) having the same configuration are interconnected through the network.

Each of the MFPs 10 includes a CPU 11, RAM 12 as a work memory, flash memory 13 that stores various programs and data therein, communication interface 15 connected with the TCP/IP network, printing portion 17 that forms an image on a paper with a laser printing method or an inkjet printing method, scanning portion 19 that optically reads out an original placed on a stage, and display and operating portion 21 as a user interface including various user-operable keys and a display portion. The MFP 10 is configured to execute various programs with the CPU 11 so as to actualize a printer function, scanner function, copy function, and the like.

For example, when receiving printing data from the PC 30 through the communication interface 15, the CPU 11 controls the printing portion 17 to form a printing image on the paper based on the received printing data (printer function). In addition, when a scanning command is inputted with the display and operating portion 21 operated by a user, the CPU 11 controls the scanning portion 19 to generate image data corresponding to an image obtained by scanning the original on the stage and transmit the generated image data to a predetermined PC 30 via the communication interface 15 (scanner function).

Additionally, the MFP 10 is provided with a web server function, an SSL (Secure Socket Layer) communication function, and a function of a certificate authority (CA). The flash memory 13 includes memory areas for a self-signing server certificate (electronic certificate) issued by the MFP 10 and server private key, and a device management information storing area. It is noted that the device management information storing area serves as a memory area for storing device management information of the other MFP 10 that includes expiration date information representing an expiration date of the server certificate managed by the other MFP 10.

Figure 2:
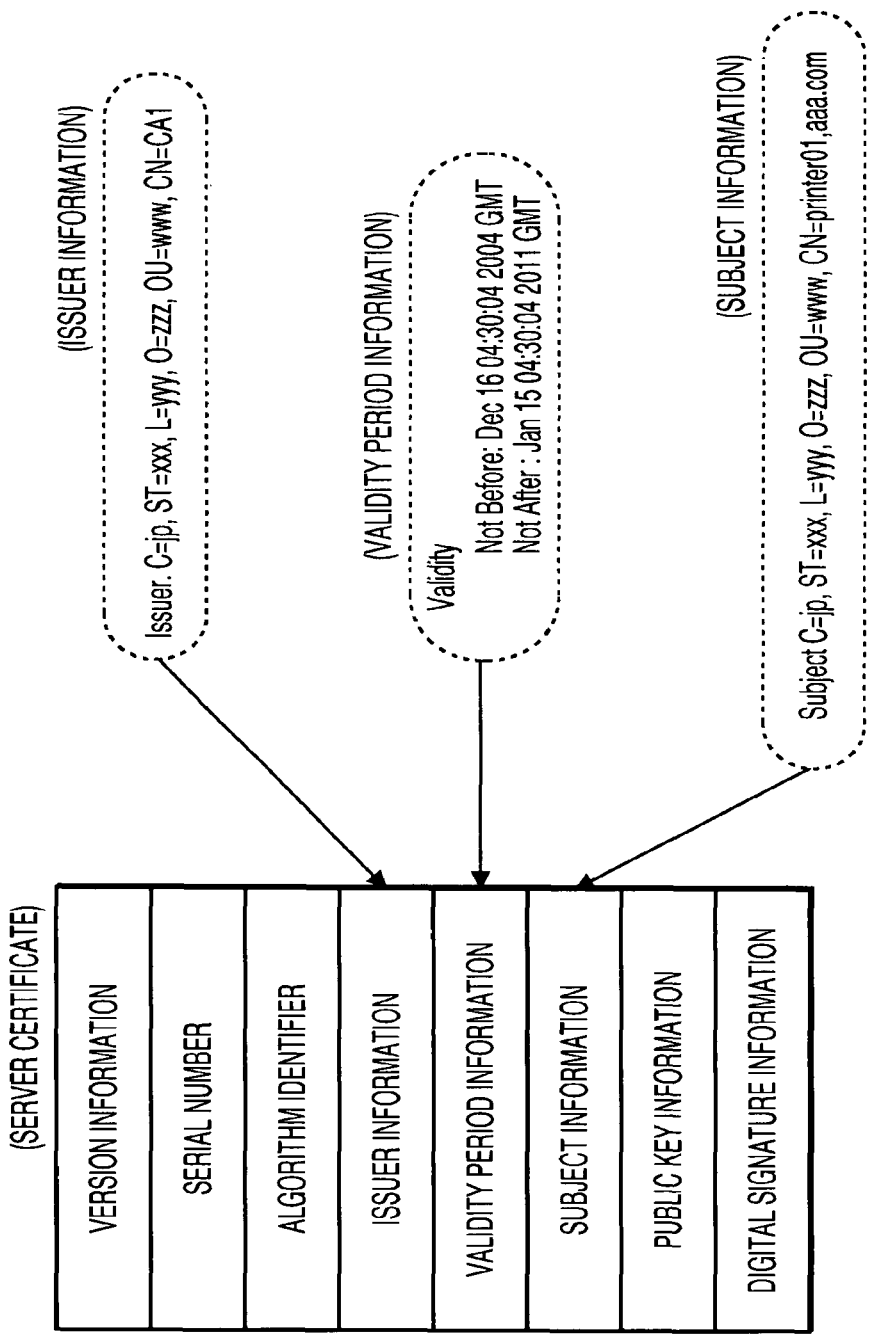
FIG. 2 is an illustration showing a configuration of a server certificate used in the communication system in accordance with one or more aspects of the present invention.

In addition, the MFP 10 stores the latest time (a time stamp) when the MFP 10 has sent device management information thereof stored in the flash memory 13 (details will be described later). FIG. 2 is an illustration showing a configuration of the server certificate stored in the flash memory 13 of the MFP 10.

As shown in FIG. 2, the server certificate used by the communication system 1 in the embodiment for the SSL communication includes version information representing a version of the certificate, a serial number of the certificate, an algorithm identifier, issuer information representing an issuer of the certificate who has given digital signature, validity period information representing a period of validity for the certificate, subject information representing an owner of the certificate, public key information representing a public key of the owner, and digital signature information representing a digital signature value. Further, the subject information of the server certificate has an FQDN (Full Qualified Domain Name) of the MFP 10, and the validity period information is configured to represent a start time and an end time (the expiration date) of the period of validity for the certificate.

Further, the server certificate that the MFP 10 has is sent to a PC 30 as a destination based on a handshake protocol for the SSL communication. It is noted that each of the PCs 30 in the embodiment is configured in the same manner, and the SSL communication can be attained by running the various programs with the CPU 31. Specifically, as shown in FIG. 1, each of the PCs 30 is provided with a CPU 31, RAM 32 as a work memory, ROM 33 that stores a boot program therein, hard disk drive (HDD) 34, communication interface 35 connected with the TCP/IP network, operating portion 37 including a keyboard and pointing device, and display portion 39 including a liquid crystal monitor.

Each of the PCs 30 stores, in the HDD 34, a CA certificate for verifying the server certificate, its own client certificate and client secret key issued by an MFP 10, and a password provided to the MFP 10 in an operation for client authentication. In addition, each of the PCs 30 verifies the server certificate using the CA certificate stored in the HDD 34, and sends the client certificate thereof to the MFP 10 as required. Further, when an SSL handshake is performed, each of the PCs 30 sends the password stored in the HDD 34 to the MFP 10 and puts itself through a procedure for the client authentication.

For the management PC 30a among the plurality of PCs 30, a management tool (management program) for executing a management PC process as described below is installed in the HDD 34 of the management PC 30a. Thereby, the management PC 30a is configured to adequately acquire the device management information of each of the MFPs 10 (server certificate information and device information of each of the MFPs 10). It is noted that the aforementioned management tool is not installed into each of the normal PCs 30b other than the management PC 30a. That is, the management PC 30a is differentiated from each of the normal PCs 30b only by the aforementioned management tool installed therein. It is noted that, although there is provided on the network in the embodiment only one management PC 30a, a plurality of management PCs 30a may be provided.

Figure 3:
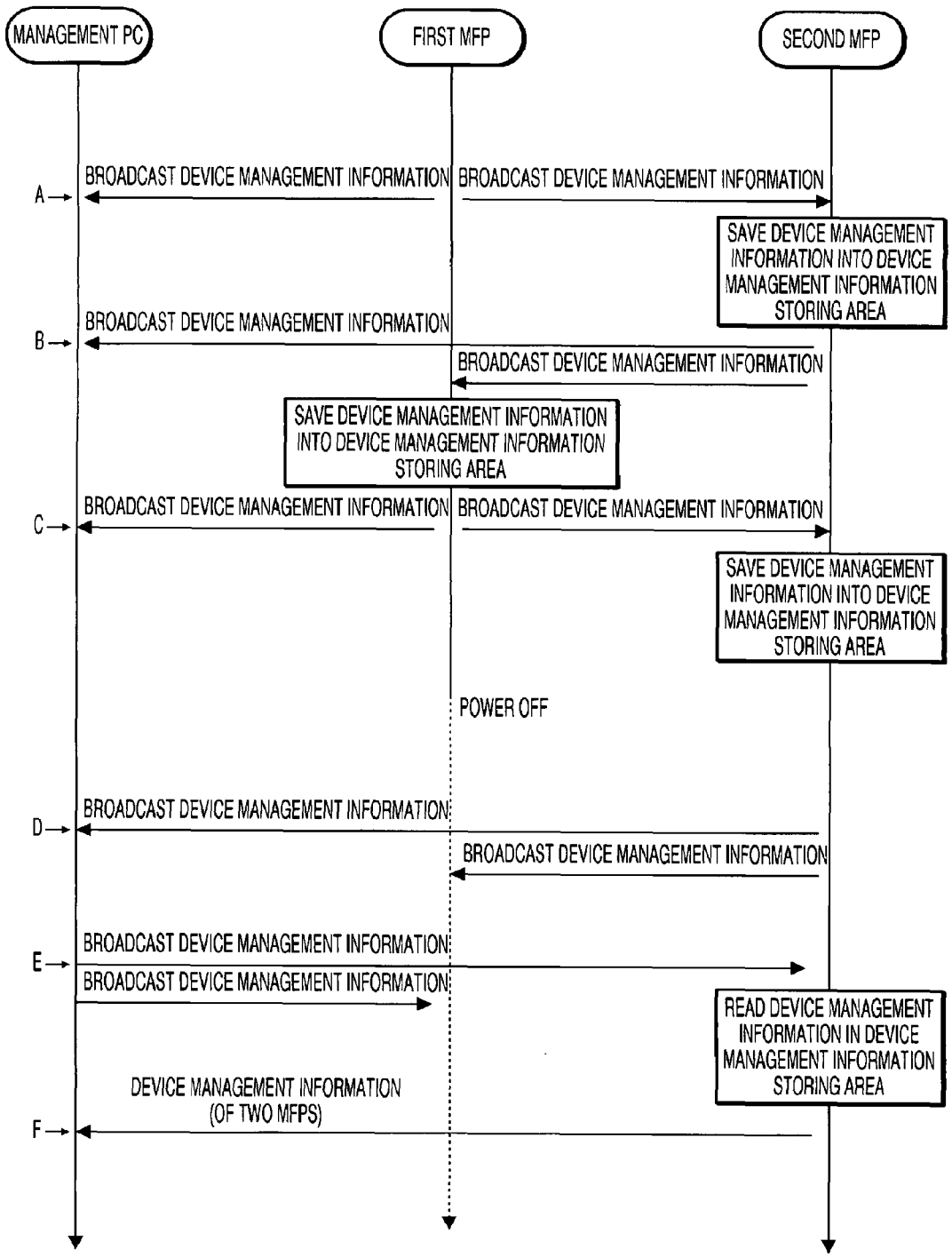
FIG. 3 is a ladder chart showing a procedure in which a management PC acquires device management information of each MFP in accordance with one or more aspects of the present invention.

Next, a schematic procedure in which the management PC 30a acquires the device management information will be explained with reference to FIG. 3. FIG. 3 is a ladder chart showing a procedure in which the management PC 30a acquires the device management information of each of the MFPs 10.

Each of the MFPs 10 is configured to regularly broadcast the device management information thereof (the server certificate information and device information thereof) to each of the devices connected with the network (details will be described later with reference to FIG. 4).

As shown in FIG. 3, firstly, the first MFP 10 broadcasts the device management information thereof (A). At this time, the PCs 30 including the management PC 30a do not perform any operation. Meanwhile, the second MFP 10 (namely, the MFP 10 other than the first MFP 10 that has broadcasted the device management information) stores the device management information transmitted by the first MFP 10 via the network into the device management information storing area of the flash memory 13.

Next, the second MFP 10 broadcasts the device management information thereof (B). At this time, the PCs 30 including the management PC 30a do not perform any operation in the same manner as when receiving the device management from the first MFP 10. In the meantime, the first MFP 10 stores the device management information transmitted by the second MFP 10 via the network into the device management information storing area of the flash memory 13.

Next, when a predetermined time period has elapsed after the first MFP 10 has sent the device management information, the first MFP 10 broadcasts the device management information thereof again (C).

Then, the second MFP 10 updates the device management information stored in the flash memory 13 with the device management information newly received from the first MFP 10.

Thus each of the MFPs 10 shares the device management information managed by the other MFP 10. Here, the following explanation will be given, assuming that the first MFP 10 is powered OFF and only the second MFP 10 works on the network.

When a predetermined time period has elapsed after the second MFP 10 has sent the device management information, the second MFP 10 broadcasts the device management information thereof again (D).

Then, when the management tool stored in the management PC 30*a* is run by a user of the management PC 30*a*, the management PC 30*a* broadcasts a request for the device management information in the below-mentioned management PC process (E).

After the MFP (in this case, only the second MFP 10) has received the request for the device management information, the second MFP acquires, from the flash memory 13, the device management information of the first MFP 10 stored in the device management information storing area, as well as the device management information thereof that includes the current device information (a remaining toner amount, the number of remaining printing papers, etc.) and the server certificate information extracted from the server certificate. Then, the second MFP 10 sends the acquired device management information to the management PC 30*a* as a requesting source of the device management information (F). It is noted that here the second MFP 10 sends the device management information of both of the first MFP 10 and the second MFP 10.

Thus, the management PC 30*a* can acquire the device management information of each of the MFPs 10, when at least one of the MFPs 10 is booted. It is noted that, although the server certificate information and the device information are concurrently broadcasted as the device management information in the embodiment, the server certificate information and the device information may be broadcasted at different moments, respectively.

Figure 5:
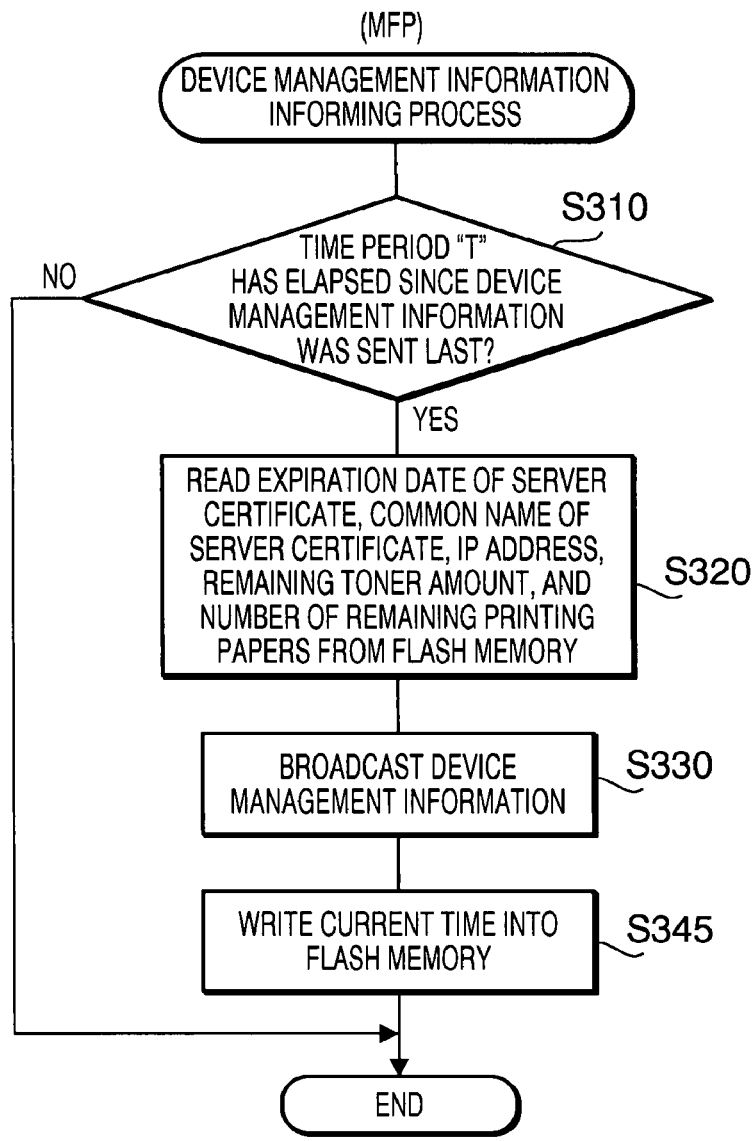
FIG. 5 is a flowchart showing a device management information informing process in the MFP process in accordance with one or more aspects of the present invention.
Figure 6:
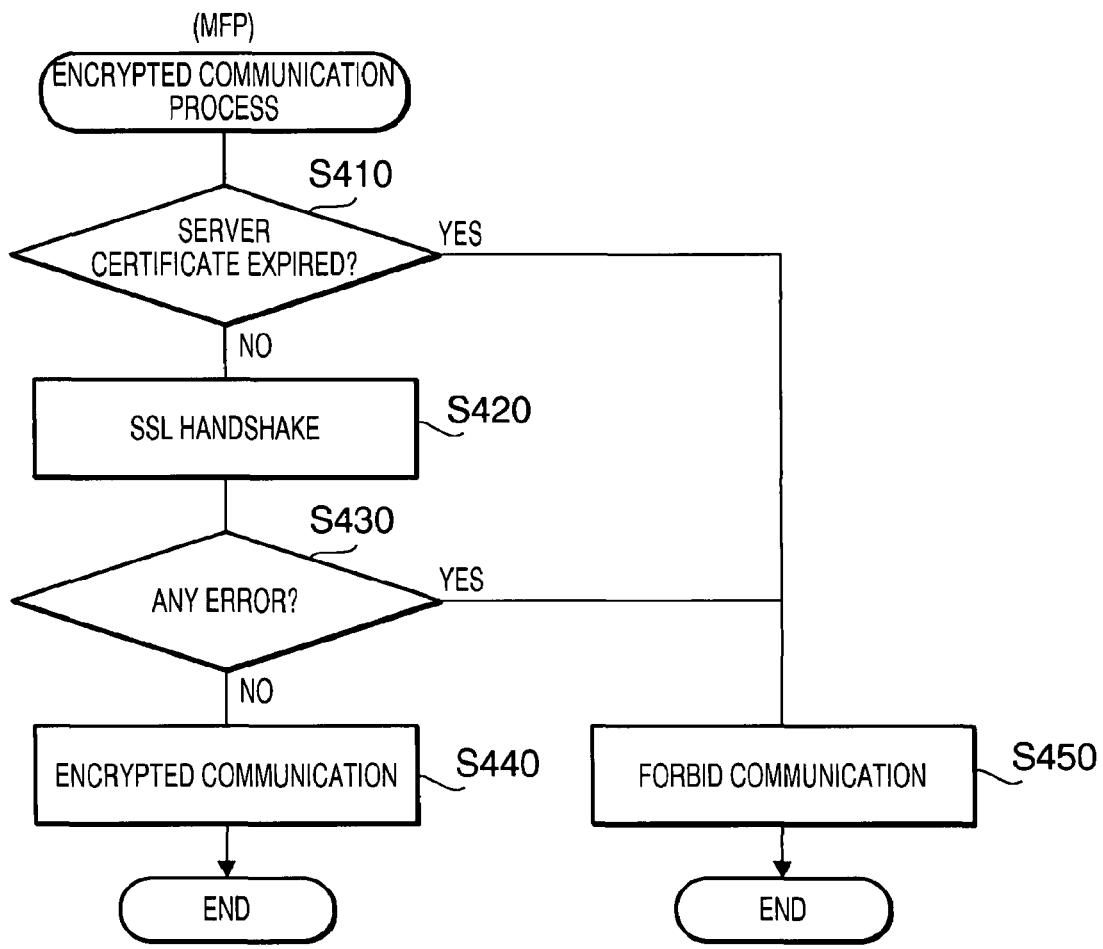
FIG. 6 is a flowchart showing an encrypted communication process in the MFP process in accordance with one or more aspects of the present invention.
Figure 7:
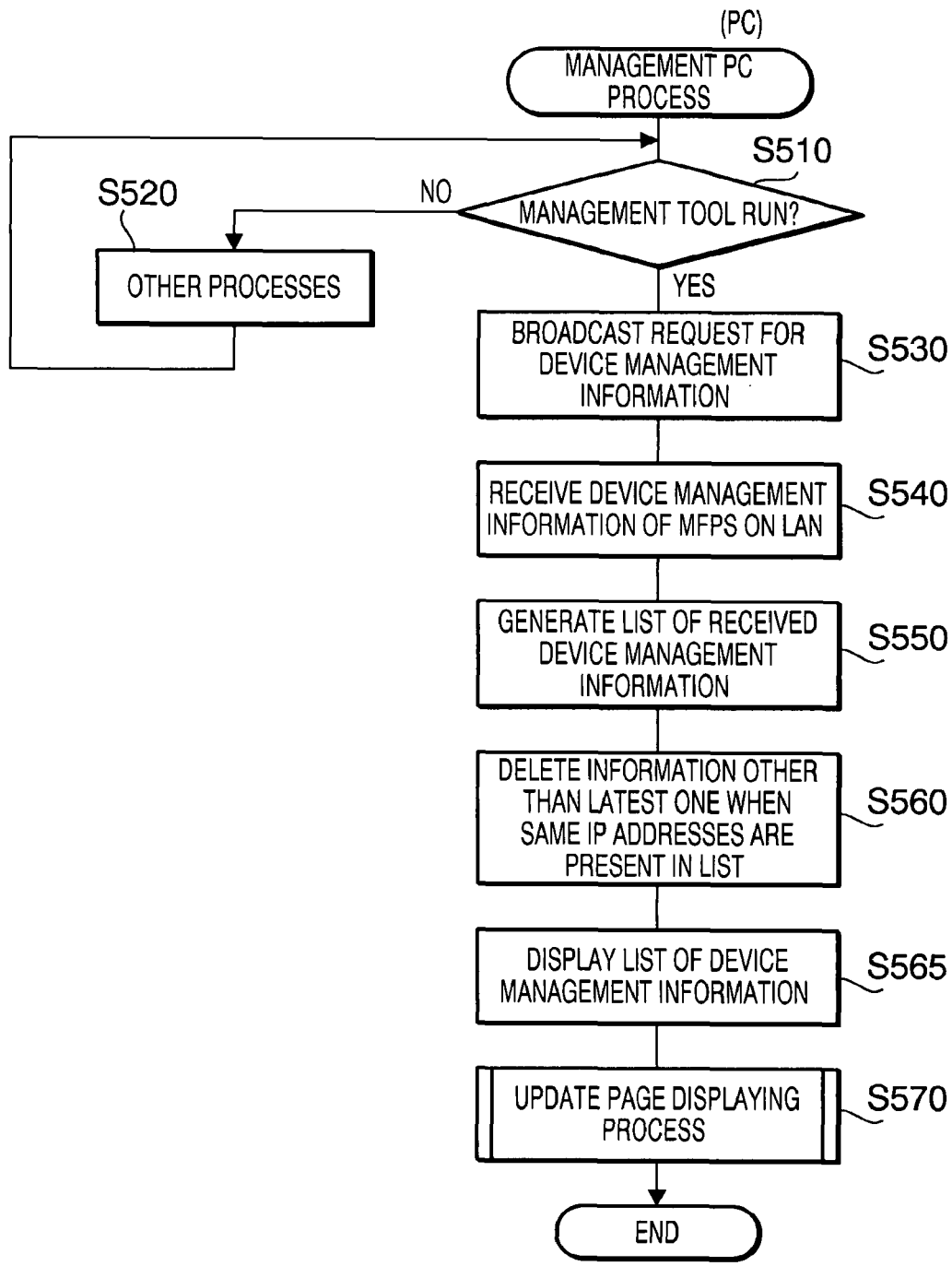
FIG. 7 is a flowchart showing a management PC process to be executed by a CPU of the management PC in accordance with one or more aspects of the present invention.
Figure 8:
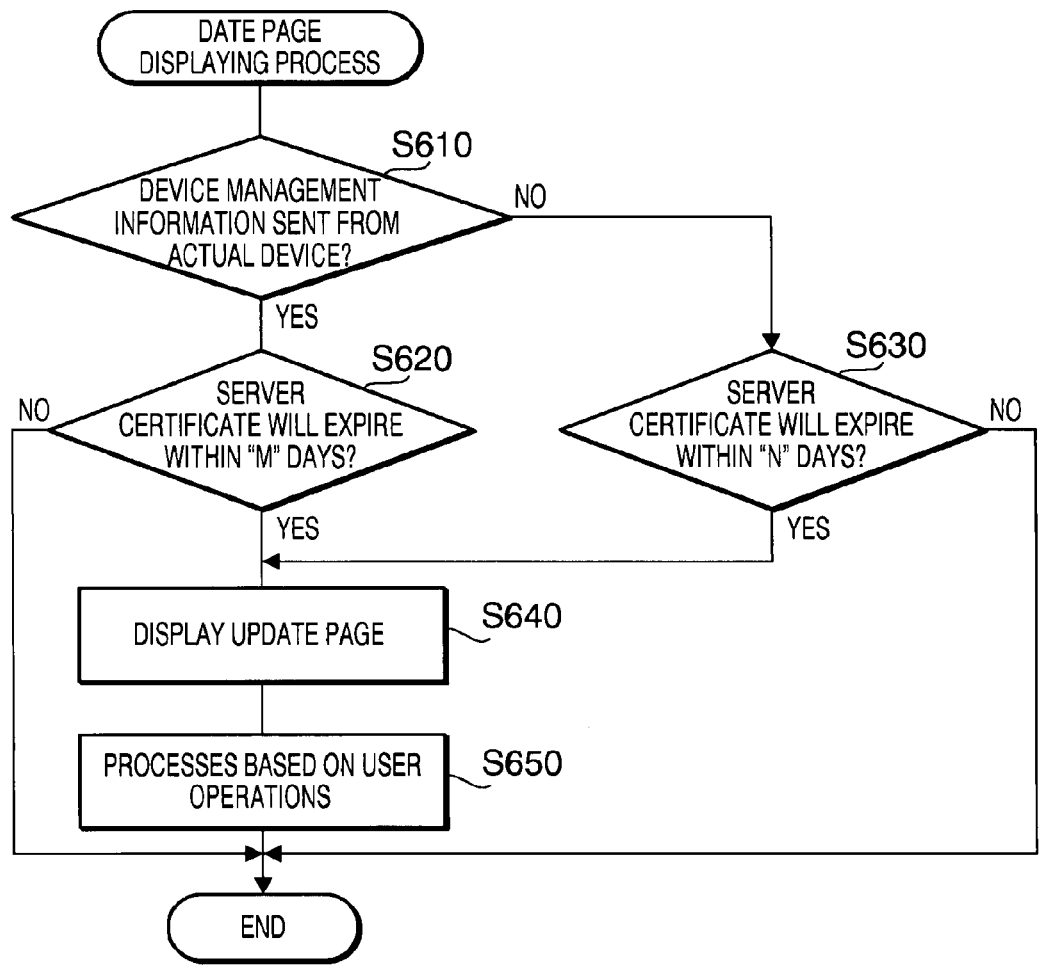
FIG. 8 is a flowchart showing an update page displaying process in the management PC process in accordance with one or more aspects of the present invention.

Next, processes for carrying out the operations shown in the ladder chart of FIG. 3 in the MFPs 10 and management PC 30*a* will be explained with reference to FIGS. 4 to 8. FIG. 4 is a flowchart showing an MFP process to be executed by the CPU 11 of each of the MFPs 10. FIG. 5 is a flowchart showing a device management information informing process in the MFP process. FIG. 6 is a flowchart showing an encrypted communication process in the MFP process. FIG. 7 is a flowchart showing a management PC process to be executed by the CPU 31 of the management PC 30*a*. FIG. 8 is a flowchart showing an update page displaying process in the management PC process.

Figure 4:
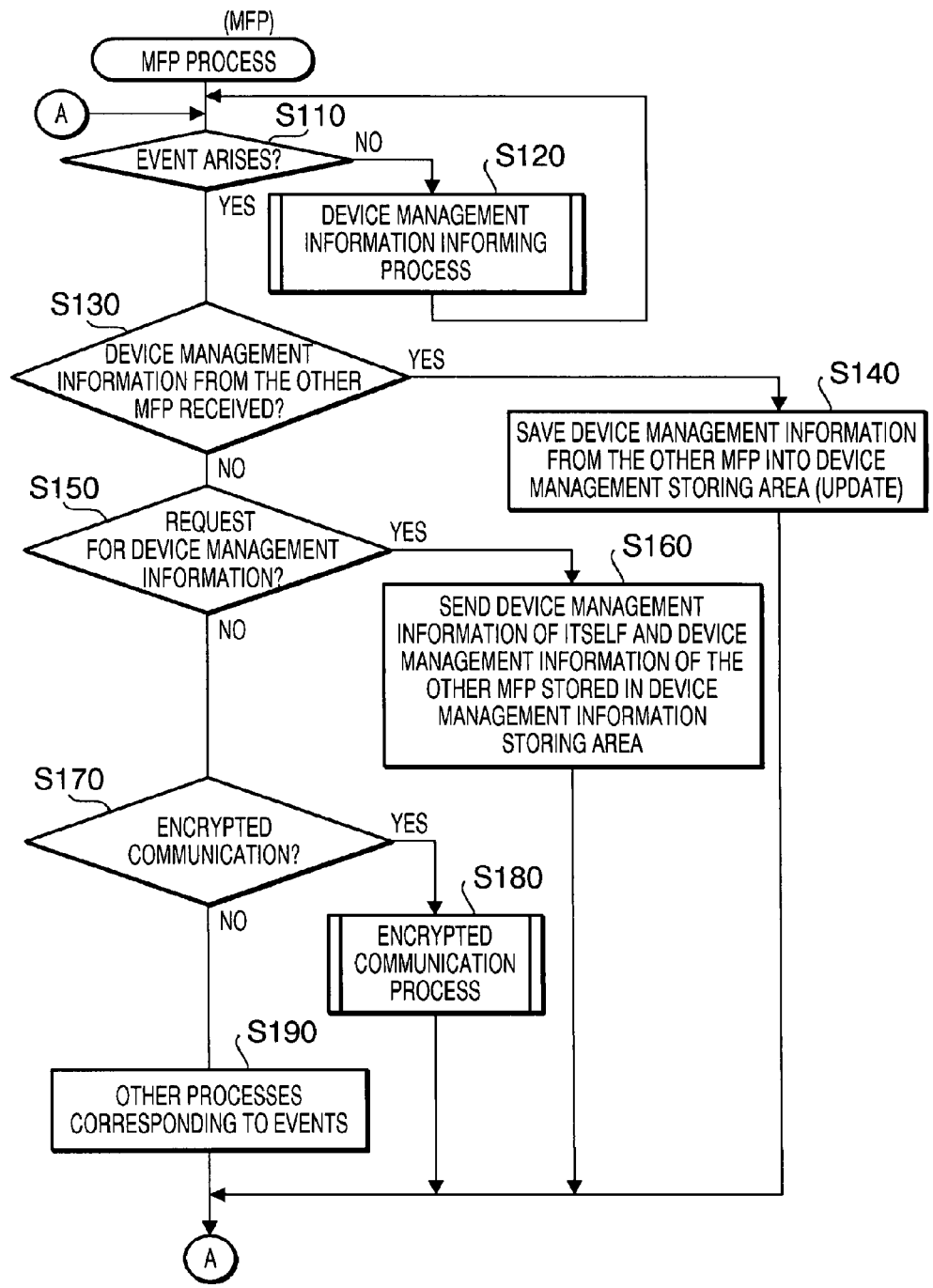
FIG. 4 is a flowchart showing an MFP process to be executed by a CPU of each of the MFPs in accordance with one or more aspects of the present invention.

By executing the MFP process shown in FIG. 4, each of the MFPs 10 accepts the device management information and the request for the device management information from the other MFP 10 as well as printing data as transmitted.

The MFP process is started in each of the MFPs 10 when each of the MFPs 10 is booted. When starting the MFP process, the CPU 11 judges whether an event arises, such as an access to an HTTPS port (an encrypted web access), an access to an HTTP port (non-encrypted web access), an access to an encryption printing port, an access to a non-encryption printing port, and receipt of a packet from the management PC 30*a* or the other MFP 10 (S110).

When it is judged that an event arises (S110: Yes), the process goes to a step of S130. Meanwhile, when it is not judged that an event arises (S110: No), in a step of S120, the device management information informing process is performed.

In the device management information informing process, the CPU 11 regularly broadcasts the device management information recorded in the flash memory 13. Specifically, as shown in FIG. 5, it is judged whether a predetermined time period T (for example, 30 minutes) that has previously been set has elapsed since the device management information was sent last (S310).

When it is not judged that the predetermined time period T has elapsed (S310: No), the device management information informing process is terminated. Meanwhile, when it is judged that the predetermined time period T has elapsed (S310: Yes), the process goes to a step of S320, and the CPU 11 reads out the "expiration date of the server certificate", "common name", "IP address of the MFP 10", "remaining toner amount", and "number of remaining printing papers" from the flash memory 13 into a temporary memory such as the RAM 32 (S320).

Subsequently, the CPU 11 broadcasts the device management information configured with a "time stamp (information on current time)" being added to the information read out in the previous step of S320 such as the "expiration date of the server certificate", "common name", "IP address of the MFP 10", "remaining toner amount", and "number of remaining printing papers" (S330).

The device management information to be broadcasted in the step of S330 is represented, for example, in a form as shown in FIG. 9A. Namely, the device management information includes the expiration date of the server certificate, the IP address of the MFP 10 that manages the server certificate, the name of the server certificate (common name), the time when the MFP 10 transmits the device management information, and the device information such as the remaining toner amount and the number of the remaining printing papers. Therefore, by receiving the device management information, it is possible to specify the aforementioned items.

In addition, in the steps of sending the device management information such as S330, specifying information (specifically, the IP address) for specifying a sending source device that has sent the device management information is added to a header of the transmitted information. Therefore, the device management information is configured such that a device that has received the device management information can specify the sending source device that has sent the device management information.

Subsequently, after the step of S330 has been completed, the current time is written into the flash memory 13 as transmission time when the device management information has been sent (S345), and then the device management information informing process is terminated.

Next, as shown in FIG. 4 to be referred to again, when it is judged that an event arises in the step of S110 (S110: Yes), it is judged whether the event is the receipt of the device management information (S130). When it is judged that the event is the receipt of the device management information (S130: Yes), the device management information received from the other MFP 10 is saved in the device management information storing area of the flash memory 13 (S140), and the MFP process is repeated from the beginning.

Here, as shown in FIG. 9B, the device management information received from the other MFP 10 is the same as the device management information transmitted by the other MFP 10 (see FIG. 9A), and is stored in the flash memory 13. It is noted that there is explained in the embodiment the case where the two MFPs 10 (the first MFP and the second MFP) are connected to the network, yet the present invention is not limited to such a case. When three or more MFPs 10 are connected to the network, each of the MFPs 10 broadcasts the device management information thereof every a predetermined time period, and stores the device management information sent from all of the other MFPs 10 into the flash memory 13. In this case, all the device management information as received is registered in a manner added to the device management information shown in FIG. 9B. When new device management information is received again from an MFP 10 of which the device management information has previously been registered after a predetermined time period, the device management information (the expiration data of the certificate, common name, device information such as the remaining toner amount and the number of the remaining printing papers, and the time stamp) including a record of the same IP address as that of the MFP 10 is updated.

In the meantime, when it is not judged that the event which arises in S110 is receipt of the device management information (S130: No), it is judged whether the request for the device management information has been received from the management PC 30a (S150). When it is judged that the request for the device management information has been received (S150: Yes), the device management information of the MFP 10 stored in the flash memory 13 and the device management information of the other MFPs 10 in the device management information storing area of the flash memory 13 are read out into the temporary memory such as the RAM 32, and are transmitted to the management PC 30a (S160). Then, after the transmission has been completed, the MFP process is repeated from the beginning.

The device management information transmitted in the step of S160 is represented, for example, in a form as shown in FIG. 9C. Namely, since the device management information includes information related to two or more MFPs 10 (in this case, the first MFP 10 and the second MFP 10), by receiving the device management information, the device management information managed by the two or more MFPs 10 can concurrently be recognized. At this time, the MFP 10 acquires the expiration date of the server certificate and the device information stored in the flash memory 13 again in response to receiving the request for the device management information from the management PC 30a. The MFP 10 sends the acquired information and the IP address thereof as the device management information thereof (which includes the current time as the time stamp) to the management PC 30a.

In the meantime, when it is not judged that the request for the device management information has been received from the management PC 30a (S150: No), it is judged whether a request for the encrypted communication has been received from another device (S170). When it is judged that the request for the encrypted communication has been received (S170: Yes), an encrypted communication process is performed (S180), and the MFP process is repeated from the beginning after the encrypted communication process has been completed.

Further, in the step of S170, when it is not judged that the request for the encrypted communication has been received (S170: No), another process corresponding the received event is performed (S190), and the MFP process is repeated from the beginning after the encrypted communication process has been completed.

In the meantime, the encrypted communication process (S180) is a process for controlling execution of the encrypted communication (SSL communication) based on judgment whether the server certificate is expired. Specifically, as shown in FIG. 6, firstly, it is judged whether the server certificate is expired (S410). When it is judged that the server certificate is expired (S410: Yes), the encrypted communication is forbidden (S450), and the encrypted communication process is terminated.

Further, in S410, when it is not judged that the server certificate is expired (S410: No), the SSL handshake is performed (S420). Here, the SSL handshake means a process for actualizing the SSL communication by performing operations of sending and receiving the server certificate between the MFP 10 that caries out the encrypted communication process and another device (one of the PCs 30 and the other MFP 10).

Subsequently, in the SSL handshake, it is judged whether an error arises (S430). When it is judged that an error arises (S430: Yes), the encrypted communication is forbidden (S450), and the encrypted communication process is terminated.

In addition, when it is not judged that an error arises in the handshake (S430: No), a predetermined encrypted communication based on the SSL is performed (S440), and the encrypted communication process is terminated after the encrypted communication has been completed.

Next, the management PC process will be described with reference to FIG. 7. The management PC process is a process for performing various processes including a process in which the management PC 30a collects information (device management information) regarding the server certificate managed by each of the MFPs 10.

Specifically, as shown in FIG. 7, it is judged whether the management tool installed in the HDD 34 has been run (S510). When it is not judged that the management tool has been run (S510: No), a process corresponding to another application that has been run is performed (S520), and the process goes back to S510.

Meanwhile, when it is judged that the management tool has been run (S510: Yes), the request for the device management information is broadcasted. Subsequently, in response to the request for the device management information, the device management information transmitted from each of the MFPs 10 is received (S540). In this step, when at least one of the MFPs 10 works, the device management information managed by each of all the MFPs 10 can be received. However, when the device management information cannot be received for some reasons, the step may be configured to show an error display and repeat the management PC process from the beginning.

Subsequently, a list of the device management information as received is generated (S550). Then, it is judged whether the same common names are present in the list. When it is judged that the same common names are present in the list, referring to the time stamp in a record (device management information) including each of the same common names in the list, records other than a record of the latest update time are deleted from the list. Further, when there is found, among the records (device management information) including the same common name in the list, a record that includes an IP address identical to an IP address included in a header of a received data packet corresponding to the record, the same effect as the aforementioned case can be brought by deleting records including the same common name other than the record from the list.

There is displayed on the display portion 39 the list of the device management information obtained after deleting records other than the device management information of the latest update time among the device management information including the same common name in S560 (S565). Then, an update page displaying process is executed for each of the device management information (S570), and the management PC process is terminated after the update page displaying process has been completed.

The update page displaying process (S570) is a process for checking the expiration date of the server certificate managed by each of the MFPs 10 and inducing the user to update the server certificate when the server certificate will expire within a predetermined time period.

Specifically, as shown in FIG. 8, firstly, it is judged whether the device management information has been transmitted from an actual device (S610). It is noted that when the device management information managed by an MFP 10 has been transmitted by the MFP 10, it is judged that the device management information has been transmitted from the actual device. Specifically, an IP address of the sending source of the received device management information included in the header added to the received device management information is compared with an IP address included in the received device management information. When the IP address included in the header is identical to the IP address included in the device management information, it is judged that the device management information has been transmitted from the actual device. Meanwhile, when the IP address included in the header is not identical to the IP address included in the device management information, it is judged that the device management information has been transmitted from the other MFP 10 different from the actual device.

When it is judged that the device management information has been transmitted from the actual device (S610: Yes), it is judged whether the server certificate will expire within a first predetermined period of M days that has previously set (S620). When it is judged that the server certificate will expire within M days (S620: Yes), the process goes to a step of S640. Meanwhile, when it is not judged that the server certificate will expire within M days (S620: No), the update page displaying process is terminated.

In the meantime, in S610, when it is not judged that the device management information has been transmitted from the actual device (S610: No), it is judged whether the server certificate will expire within a second predetermined period of N days that has previously set (S630). When it is judged that the server certificate will expire within N days (S630: Yes), the process goes to a step of S640. Meanwhile, when it is not judged that the server certificate will expire within N days (S630: No), the update page displaying process is terminated.

Here, the first predetermined period of M days and the second predetermined period of N days are set as M less than N (namely, such that the second predetermined period of N days is longer than the first predetermined period of M days). This is because it is necessary to induce the user to early bring the other MFP 10 different from the actual device, which might be in an incommunicable state since the expiration date of the server certificate managed thereby has not been transmitted directly therefrom, out of the incommunicable state and update the server certificate managed by the other MFP 10.

Subsequently, in S640, there is displayed in a pop-up manner on the display portion 39 an update page for generating a certificate signing request (CSR) that requests the CA to issue a server certificate so as to update the server certificate. Information regarding the update page is previously registered in the HDD 34 of the management PC 30*a* as a portion of the management tool. In this case, the CSR is generated on the management PC 30*a* with the update page so as to update the server certificate. Meanwhile, when the information regarding the update page is not registered in the HDD 34, the CSR may be generated on a device such as a printer and an MFP on the Internet. In this case, the information regarding the update page may be searched on the Internet based on the sort of information (the common name etc.) included in the server certificate so that the update page can be displayed.

Next, various processes including a process of updating the server certificate based on user operations are executed (S650), and the update page displaying process is terminated after the various processes have been completed.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

In the aforementioned embodiment, the SSL is employed for the encrypted communication. However, for example, communication methods using the electronic certificate other than the SSL may be employed.

The invention claimed is:

1. A first peripheral device comprising:
a memory configured to store first management information of the first peripheral device; and
a processor configured to perform:
receiving, by the first peripheral device, second management information of a second peripheral device that is broadcasted by the second peripheral device;
receiving, by the first peripheral device, a management information request from a terminal device; and
transmitting, from the first peripheral device, management information to the terminal device in response to the management information request, the management information including the first management information of the first peripheral device stored in the memory and the second management information of the second peripheral device received from the second peripheral device.

2. The first peripheral device according to claim 1,
wherein the processor is configured to receive a plurality of pieces of second management information of a plurality of second peripheral devices, the plurality of pieces of second management information comprising the second management information broadcasted by the second peripheral device and one or more pieces of different second management information transmitted by one or more different second peripheral devices, and
wherein the transmitting of the management information comprises transmitting, to the terminal device, the management information that includes the first management information of the first peripheral device stored in the memory and the plurality of pieces of second management information of the plurality of second peripheral devices received from the plurality of second peripheral devices.

3. The first peripheral device according to claim 1, wherein the processor is configured to receive the second management information of the second peripheral device broadcasted by the second peripheral device, prior to receiving the management information request from the terminal device.

4. The first peripheral device according to claim 1, wherein the processor is further configured to perform broadcasting the first management information of the first peripheral device to the second peripheral device.

5. The first peripheral device according to claim 1, wherein the processor is configured to:
   transmit the first management information of the first peripheral device to a plurality of second peripheral devices that comprises the second peripheral device and one or more different second peripheral devices; and
   receive a plurality of pieces of second management information of the plurality of second peripheral devices, the plurality of pieces of second management information comprising the second management information broadcasted by the second peripheral device and one or more pieces of different second management information transmitted by one or more different second peripheral devices, and
   wherein the transmitting of the management information comprises transmitting, to the terminal device, the management information that includes the first management information of the first peripheral device stored in the memory and the plurality of pieces of second management information of the plurality of second peripheral devices received from the plurality of second peripheral devices.

6. The first peripheral device according to claim 1, wherein the processor is configured to:
   transmit the first management information of the first peripheral device to the second peripheral device, prior to receiving the management information request from the terminal device; and
   receive the second management information of the second peripheral device broadcasted by the second peripheral device, prior to receiving the management information request from the terminal device.

7. The first peripheral device according to claim 1, wherein the receiving of the management information request comprises receiving the management information request broadcasted by the terminal device.

8. A non-transitory computer readable medium storing computer readable instructions that, when executed by a processor, cause the processor to perform:
   storing first management information of a first peripheral device in a memory of the first peripheral device;
   receiving, by the first peripheral device, second management information of a second peripheral device that is broadcasted by the second peripheral device;
   receiving, by the first peripheral device, a management information request from a terminal device; and
   transmitting, from the first peripheral device, management information to the terminal device in response to the management information request, the management information including the first management information of the first peripheral device stored in the memory and the second management information of the second peripheral device received from the second peripheral device.

9. A terminal device comprising:
   a processor configured to perform:
      transmitting a management information request to a plurality of peripheral devices comprising a first peripheral device and a second peripheral device; and
      receiving a plurality of management information groups from the plurality of peripheral devices in response to the management information request,
   wherein the receiving of the plurality of management information groups comprises:
      receiving, from the first peripheral device, a first management information group including first management information of the first peripheral device and second management information of the second peripheral device, the second management information being acquired by the first peripheral device from the second peripheral device; and
      receiving, from the second peripheral device, a second management information group including the second management information of the second peripheral device and the first management information of the first peripheral device, the first management information being acquired by the second peripheral device from the first peripheral device.

10. The terminal device according to claim 9, wherein the transmitting of the management information request comprises broadcasting the management information request to the plurality of peripheral devices.

11. A non-transitory computer readable medium storing computer readable instructions that, when executed by a processor, cause the processor to perform:
    transmitting a management information request to a plurality of peripheral devices comprising a first peripheral device and a second peripheral device; and
    receiving a plurality of management information groups from the plurality of peripheral devices in response to the management information request, and
    wherein the receiving of the plurality of management information groups comprises:
       receiving, from the first peripheral device, a first management information group including first management information of the first peripheral device and second management information of the second peripheral device, the second management information being acquired by the first peripheral device from the second peripheral device; and
       receiving, from the second peripheral device, a second management information group including the second management information of the second peripheral device and the first management information, of the first peripheral device, the first management information being acquired by the second peripheral device from the first peripheral device.

12. A system comprising:
    a first peripheral device comprising:
       a first memory configured to store first management information of the first peripheral device; and
       a first processor coupled to the first memory;
    a second peripheral device comprising:
       a second memory configured to store second management information of the second peripheral device; and
       a second processor coupled to the second memory; and
    a terminal device comprising a third processor,
    wherein the first peripheral device, the second peripheral device and the terminal device are configured to be connected with each other via a communication network;
    wherein the first processor is configured to:
       regularly broadcast the first management information via the communication network,
       receive the second management information that is regularly broadcasted by the second peripheral device;
       update the second management information upon receiving the second management information from the second peripheral device; and transmit, when failing to receive the second management information to be regularly broadcasted by the second peripheral device and when receiving a management information request from a terminal device, a first management information group to the terminal device in response to the management information request, wherein the first management information includes the first management information of the first peripheral device stored in the first memory and the last updated second management information of the second peripheral device received from the second peripheral device, wherein the second processor is configured to:
  regularly broadcast the second management information via the communication network;
  receive the first management information that is regularly broadcasted by the first peripheral device;
  update the first management information upon receiving the first management information from the first peripheral device; and
  transmit, when failing to receive the first management information to be regularly broadcasted by the first peripheral device and when receiving a management information request from a terminal device, a second management information group to the terminal device in response to the management information request, wherein the second management information group includes the second management information of the second peripheral device stored in the second memory and the last updated first management information of the first peripheral device received from the first peripheral device, and wherein the third processor is configured to:
  transmit a management information request to a plurality of peripheral devices comprising the first peripheral device and the second peripheral device;
  receive, from the first peripheral device, the first management information group including the first management information of the first peripheral device and second management information of the second peripheral device, the second management information being acquired by the first peripheral device from the second peripheral device; and
  receive, from the second peripheral device, the second management information group including the second management information of the second peripheral device and the first management information of the first peripheral device, the first management information being acquired by the second peripheral device from the first peripheral device.

* * * * *

UNITED STATES PATENT AND TRADEMARK OFFICE
CERTIFICATE OF CORRECTION

| | | |
|---|---|---|
| PATENT NO. | : 8,732,344 B2 | Page 1 of 1 |
| APPLICATION NO. | : 13/616207 | |
| DATED | : May 20, 2014 | |
| INVENTOR(S) | : Masafumi Miyazawa | |

It is certified that error appears in the above-identified patent and that said Letters Patent is hereby corrected as shown below:

On the Title Page:

It Should Read:

Related U.S. Application Data

(63) Continuation of U.S. Application No. 11/727,958, filed on March 29, 2007, now Pat. No. 8,291,217.

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,732,344 B2 |
| APPLICATION NO. | : 13/616207 |
| DATED | : May 20, 2014 |
| INVENTOR(S) | : Masafumi Miyazawa |

It is certified that error appears in the above-identified patent and that said Letters Patent is hereby corrected as shown below:

Title Page

It Should Read:

(Page 2, Column 2) - OTHER PUBLICATIONS

Japanese Official Action dated Nov. 5, 2009 with English translation.
United States Official Action dated Apr. 28, 2010 from related U.S. Appl. No. 11/727,958
United States Official Action dated Jul. 29, 2011 from related U.S. Appl. No. 11/727,958
United States Official Action dated Dec. 7, 2011 from related U.S. Appl. No. 11/727,958
United States Official Action dated Apr. 21, 2011 from related U.S. Appl. No. 11/727,958
Notice of Allowance dated Jun. 13, 2012 from related U.S. Appl. No. 11/727,958
United States Official Action dated Oct. 14, 2010 from related U.S. Appl. No. 11/727,958

Signed and Sealed this
Seventeenth Day of March, 2015

Michelle K. Lee
*Director of the United States Patent and Trademark Office*